USO11593712B2

United States Patent
Webster et al.

(10) Patent No.: US 11,593,712 B2
(45) Date of Patent: Feb. 28, 2023

(54) NODE-BASED INTERFACE FOR MACHINE LEARNING CLASSIFICATION MODELING

(71) Applicant: Google LLC, Mountain View, CA (US)

(72) Inventors: Barron Webster, Brooklyn, NY (US); Irene Alvarado, Brooklyn, NY (US); Kyle Phillips, Brooklyn, NY (US); Alexander Chen, Carlisle, MA (US); Jonas Pieter Halfdan Jongejan, Brooklyn, NY (US); Jordan Griffith, Brooklyn, NY (US); Amit Pitaru, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 358 days.

(21) Appl. No.: 16/865,787

(22) Filed: May 4, 2020

(65) Prior Publication Data

US 2021/0342739 A1 Nov. 4, 2021

(51) Int. Cl.
*G06N 20/00* (2019.01)
*G06F 3/0485* (2022.01)
*G06F 16/28* (2019.01)

(52) U.S. Cl.
CPC ........... *G06N 20/00* (2019.01); *G06F 3/0485* (2013.01); *G06F 16/287* (2019.01)

(58) Field of Classification Search
CPC ...... G06N 20/00; G06F 3/0485; G06F 16/287
See application file for complete search history.

(56) References Cited

U.S. PATENT DOCUMENTS

2013/0028487 A1 * 1/2013 Stager ................. B07C 5/342
  382/110
2021/0398025 A1 * 12/2021 Yamamoto ............ G06F 16/906

OTHER PUBLICATIONS

Carney, M. Using Teachable Machine in the d. school classroom. https://medium.com/@michellecarney/using-teachable-machine-in-the-d-school-classroom-96be1ba6a4f9, Nov. 2019.
Patil, A. Sit Straight, an teachable machine experiment. https://atharvapatil.github.io/teachable-browser/, Dec. 2019.
Meinders, C. Posthuman AI. Culture. Creativity. https://www.cca-ai.com.
Shi, Y. yining1023/machine-learning-for-the-web. https://github.com/yining1023/machine-learning-for-the-web, Dec. 2019. original-date: Sep. 1, 2018T21:21:53Z.

(Continued)

*Primary Examiner* — Pei Yong Weng
(74) *Attorney, Agent, or Firm* — Lerner, David, Littenberg, Krumholz & Mentlik, LLP (57) ABSTRACT

One or more processors may output for display, an interface including a data classification section including two or more class nodes, a training section including a training node, and an evaluation section including an evaluation node. At a first class node a first set of training data may be captured and at a second class node a second set of training data may be captured. In response to an input received at the training node, a classification model based on the first set of training data and the second set of training data may be trained. Evaluation data may be captured in an evaluation node, and using the trained classification model, classifications for each piece of the evaluation data may be determined. A visual representation of the classification for each piece of the evaluation data may be output for display within the evaluation node.

20 Claims, 10 Drawing Sheets

(56) References Cited

OTHER PUBLICATIONS

Ramos, et al. Emerging Perspectives in Human-Centered Machine Learning. In Extended Abstracts of the 2019 CHI Conference on Human Factors in Computing Systems—CHI EA '19, ACM Press (Glasgow, Scotland UK, 2019), 1-8.

Francoise, et al. Motion-Sound Mapping through Interaction: An Approach to User-Centered Design of Auditory Feedback Using Machine Learning. ACM Transactions on Interactive Intelligent Systems 8, 2 (Jun. 2018), 1-30.

Fails, et al., Interactive machine learning. In Proceedings of the 8th international conference on Intelligent user interfaces—IUI '03, ACM Press (Miami, Florida, USA, 2003), 39.

Dey, et al. a CAPpella: programming by demonstration of context-aware applications. In Proceedings of the 2004 conference on Human factors in computing systems—CHI '04, ACM Press (Vienna, Austria, 2004), 33-40.

Amershi, et al., Power to the People: The Role of Humans in Interactive Machine Learning. AI Magazine 35, 4 (Dec. 2014), 105.

Agassi, et al., Scratch Nodes ML: A Playful System for Children to Create Gesture Recognition Classifiers. In Extended Abstracts of the 2019 CHI Conference on Human Factors in Computing Systems—CHI EA '19, ACM Press (Glasgow, Scotland Uk, 2019), pp. 1-6.

Turn your Web Camera into a controller using a Neural Network, Webcam Pacman. https://storage.googleapis.com/tfjs-examples/webcam-transfer-learning/dist/index.html. Jul. 29, 2020, 1 page.

Meinders, C. AI. Culture. Creativity. https://www.calartsai.com.

Nyoni, B. blackgirlhair.js. https://triple.black/blackgirlhair, Dec. 2019.

Gillies, et als. Human-Centered Machine Learning. In Proceedings of the 2016 CHI Conference Extended Abstracts on Human Factors in Computing Systems—CHI EA '16, ACM Press (San Jose, California, USA, 2016), 3558-3565.

Diaz, et als. Interactive Machine Learning for More Expressive Game Interactions. In 2019 IEEE Conference on Games (CoG), IEEE (London, United Kingdom, Aug. 2019), 1-2.

Fiebrink, R. Real-time Human Interaction with Supervised Learning Algorithms for Music Composition and Performance. PhD thesis, Princeton, New Jersey, US, 2011.

Fiebrink, et al. Introduction to the Special Issue on Human-Centered Machine Learning. ACM Transactions on Interactive Intelligent Systems 8, 2 (Jun. 2018), 1-7.

Bringing AI into the Classroom, https://www.actua.ca/en/bringing-ai-into-the-classroom/, Dec. 2019.

Lane, D. Machine Learning for Kids. https://machinelearningforkids.co.uk. Oct. 2017.

Ilana Pelzman-Kern AI + Ethics Curriculum for Middle School. https://www.media.mit.edu/projects/ai-ethics-for-middle-school/overview/, Aug. 2019.

Katan, et al. Using Interactive Machine Learning to Support Interface Development Through Workshops with Disabled People. In Proceedings of the 33rd Annual ACM Conference on Human Factors in Computing Systems—CHI '15, ACM Press (Seoul, Republic of Korea, 2015), 251-254.

\* cited by examiner

NODE-BASED INTERFACE FOR MACHINE LEARNING CLASSIFICATION MODELING

BACKGROUND

Machine learning classification models are typically created by gathering training data, training a classification model with the training data, evaluating the performance of the classification model, and adjusting and retraining the classification model based on the evaluation. Each step of creating a machine learning classification model is not a trivial process and typically requires significant expertise in statistics, artificial intelligence, and programming. For instance, training data generally needs to be formatted into a particular format and labeled prior to being used to train the classification model. Moreover, the algorithms used to train the classification model, along with the parameters of how to train the classification model need to be programmed and set. Accordingly, each step of creating a machine learning classification model may impose a barrier to creating a classification model to all but those who have the required expertise.

BRIEF SUMMARY

Embodiments within the disclosure relate to creating machine learning classification models. In one aspect of the disclosure a method for creating machine learning classification models, includes outputting for display, by one or more processors, an interface including a data classification section including two or more class nodes, a training section including a training node, and an evaluation section including an evaluation node; capturing, by the one or more processors, at a first of the two or more class nodes, a first set of training data; capturing, by the one or more processors, at a second of the two or more class nodes, a second set of training data; training, by the one or more processors, in response to an input received at the training node, a classification model based on the first set of training data and the second set of training data; capturing, by the one or more processors, evaluation data in the evaluation node; determining, by the one or more processors, using the trained classification model, classifications for each piece of the evaluation data; and outputting for display, by the one or more processors, a visual representation of the classification for each piece of the evaluation data within the evaluation node.

In some examples, the data classification section, the training section, and the evaluation section are output for display in a horizontal arrangement, with the training section being positioned between the data classification section and the evaluation section.

In some examples, an add request may be received at the data classification section for an additional class; and an additional class node may be added in the data classification section in response to the add request.

In some examples, thumbnails of the first set of training data and the second set of training data are displayed in the first class node and second class node, respectively. In some instances, the first class node is automatically expanded to show additional thumbnails of the first set of training data. In some instances, the thumbnails of the first set of training data are scrollable within the first class node.

In some examples, the first and second sets of training data are captured with a capture device.

In some examples, the evaluation data is captured with a capture device. In some instances, the classifications for each piece of the evaluation data may occur as the evaluation data is captured by the capture device.

In some examples, the evaluation data is output for display in a preview window in the evaluation node as it is captured. In some examples, the evaluation node is presented as a window in the interface.

In some examples, the classification model is further trained based on parameters, the parameters comprising at least one of a number of epochs, a batch size, and a learning rate to be used by the machine learning algorithm.

Another aspect of the disclosure is directed to a system comprising one or more processors; and one or more storage devices in communication with the one or more processors, wherein the one or more storage devices contain instructions. The instructions may be configured to cause the one or more processors to: output for display an interface including a data classification section including two or more class nodes, a training section including a training node, and an evaluation section including an evaluation node; capture at a first of the two or more class nodes, a first set of training data; capture at a second of the two or more class nodes, a second set of training data; train, in response to an input received at the training node, a classification model based on the first set of training data and the second set of training data; capture evaluation data in the evaluation node; determine, using the trained classification model, classifications for each piece of the evaluation data; and output, a visual representation of the classification for each piece of the evaluation data within the evaluation node.

DETAILED DESCRIPTION

Overview

The technology relates generally to creating custom machine learning (ML) classification models using a node-based interface. The interface may be a web application provided to a client device from a server or a standalone application executed on the client device. The interface may include discrete sections that correspond to the steps of creating a classification model. In this regard, the sections may include a data classification section to capture and edit training data, a model training section to train the classification model with the training data, and a model evaluation section to provide real-time classification of new data using the trained classification model. Each section may be made up of nodes that are simultaneously displayed on the interface to provide a singular visual representation of the entire classification model workflow.

As used herein, the term "class" may refer to an object or a collection of objects that have one or more similar characteristics. The term "classification model" may refer to a ML model configured to distinguish between two or more discrete classes. By way of example, a classification model may be trained to distinguish between a dog and cat class. The classes of cats and dogs may include images or other such data associated with cats and dogs—the objects, respectively. In yet another example, a class may correspond to a particular pose, such as a person giving a "thumbs up" and another class may correspond to another pose, such as a person giving a "thumbs down." Although the aforementioned examples refer to images, other data types, such as text, audio, video, etc., or combinations of different data types may be used as training data.

Example Systems

Figure 1:
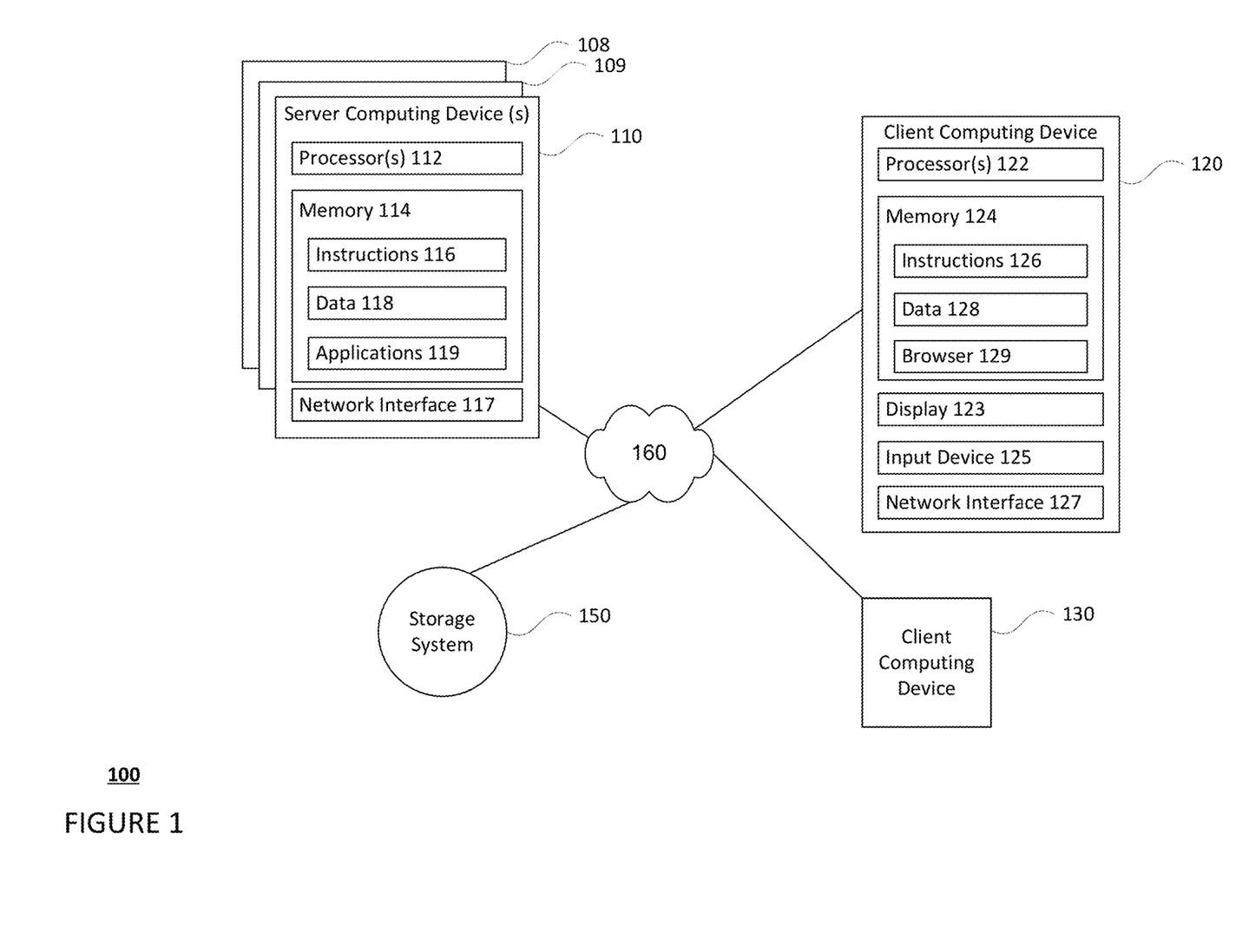
FIG. 1 is a functional diagram of an example system in accordance with aspects of the disclosure.
Figure 2:
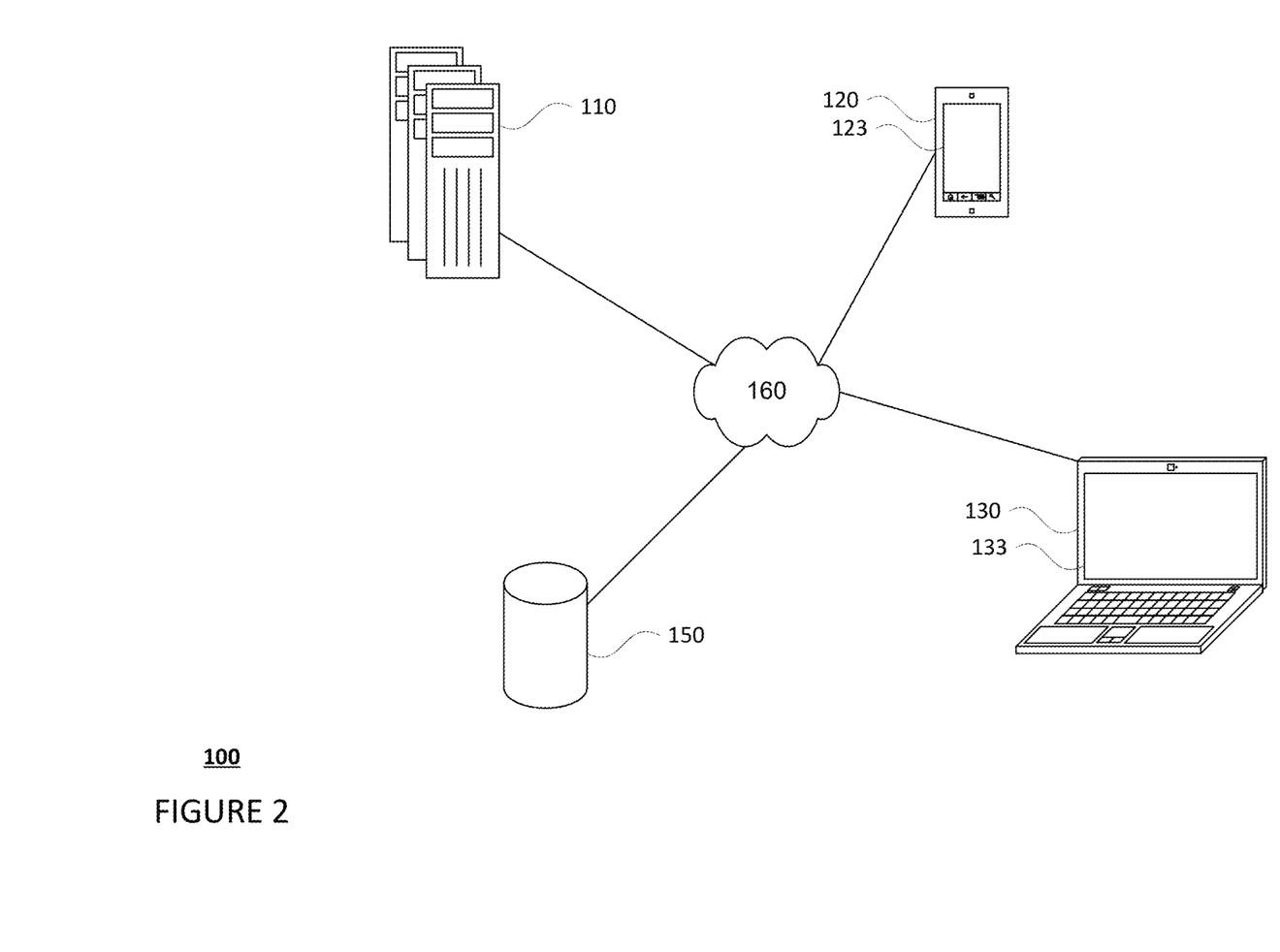
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 108-110, 120, and 130, as well as storage system 150. Each of the computing devices 108-110, 120, and 130 can contain one or more processors, memory, network interface, and other components typically present in general purpose computing devices. For example, server computing device 110 includes one or more processors 112, memory 114, and network interface 117. The other server computing devices 108 and 109 may include some or all of the components shown in server computing device 110

Memory 114 of server computing device 110 can store information accessible by the one or more processors 112, including instructions 116 that can be executed by the one or more processors 112. Memory can also include data 118 that can be retrieved, manipulated or stored by the processor. Memory can also store applications 119, including one or more web applications, as described herein. The memory 114 may be any type of non-transitory computer readable medium capable of storing information accessible by the processor 112, such as a hard-drive, solid state drive, NAND memory, tape drive, optical storage, memory card, ROM, RAM, DVD, CD-ROM, write-capable, and read-only memories The instructions 116 can be any set of instructions to be executed directly, such as machine code, or indirectly, such as scripts, by the one or more processors. In that regard, the terms "instructions," "steps," and "programs" can be used interchangeably herein. The instructions 116 can be stored in object code format for direct processing by the processor 112, or in any other computing device language including scripts or collections of independent source code modules that are interpreted on demand or compiled in advance.

Data 118 may be retrieved, stored or modified by the one or more processors 112 in accordance with the instructions 116. For instance, although the system and methods described herein is not limited by any particular data structure, the data 118 can be stored in computer registers, in a relational database as a table having many different fields and records, or XML documents. The data 118 can also be formatted in any computing device-readable format such as, but not limited to, binary values, ASCII or Unicode. Moreover, the data 118 can include any information sufficient to identify the relevant information, such as numbers, descriptive text, proprietary codes, pointers, references to data stored in other memories, such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, server computing device 110 may include specialized hardware components to perform specific computing processes, such as decoding video or video, matching video frames with images, distorting videos, encoding videos or audio, etc. faster or more efficiently.

The network interface 117 can be any device capable of enabling a computing device to communicate with another computing device or networked system. For instance, the network interface 117 may include a network interface card (NIC), WiFi card, Bluetooth receiver/transmitter, or other such device capable of communicating data over a network via one or more communication protocols, such as point-to-point communication (e.g., direct communication between two devices), Ethernet, Wi-Fi, HTTP, Bluetooth, LTE, 3G, 4G, Edge, etc., and various combinations of the foregoing Although FIG. 1 functionally illustrates the processor 112, memory 114, and other elements of server computing device 110 as being within the same block, the processor 112, memory 114, and other elements can actually comprise multiple processors, computers, computing devices, or memories that may or may not be stored within the same physical housing. For example, the memory can be a hard drive or other storage media located in housings different from that of server computing device 110. Accordingly, references to a processor, computer, computing device, or memory, when used in reference to any of computing devices will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device with one or more processors of the computing device, various aspects of the subject matter described herein can be implemented by a plurality of computing devices, for example, communicating information over network 160.

Each of the computing devices 108-110, 120, 130 can be at different nodes of a network 160 and capable of directly and/or indirectly communicating with other nodes of network 160. Although only a few computing devices 108-110, 120, 130 are depicted in system 100 of FIGS. 1 and 2, it should be appreciated that any number of connected computing devices, including server computing devices and client computing devices, and storage systems may be included in the system at different nodes of the network 160.

The network 160 and intervening nodes described herein can be interconnected using various protocols and systems, such that the network can be part of the Internet, World Wide Web, specific intranets, wide area networks, or local networks. The network can utilize standard communications protocols and systems, such as point-to-point communication (e.g., direct communication between two devices), Ethernet, Wi-Fi, HTTP, Bluetooth, LTE, 3G, 4G, 5G, Edge, etc., as well as protocols and systems that are proprietary to one or more companies, and various combinations of the foregoing. Although certain advantages may be obtained when information is transmitted or received as noted above, other aspects of the subject matter described herein are not limited to any particular manner of transmission of information.

As an example, server computing devices 108-110 may include web servers capable of communicating with storage system 150 as well as client computing devices 120, 130 via the network 160. For instance, server computing device 110 may use network 160 to transmit and present information, applications, web applications, training data, etc., to a client computing device, such as client computing devices 120, 130 for display on a display such as display 123. In this regard, client computing devices 120, 130 may perform all or some of the features described herein.

As further shown in FIG. 2, client computing device may include a web browser 129. As further described herein, the browser 129 may load an application retrieved over network 160, from one of the applications 119 stored in server computing device 110 or storage system 150. In some instances, the web browser may upload other information provided by a server or storage system. Although only a single web browser 129 is shown, there may be more than one web browser on each client computing device.

Each of the client computing devices 120, 130 may be configured similarly to server computing device 110, with one or more processors 122, memory 124 storing instructions 126 and data 128, and a network interface 127 as described above. Each client computing device 120, 130 may be a personal computing device intended for use by a user and have all of the components normally used in connection with a personal computing device such as a central processing unit (CPU), memory (e.g., RAM and internal hard drives) storing data and instructions, a display such as displays 123, 133 (e.g., a monitor having a screen, a touch-screen, a projector, a television, or other device that is operable to display information), and input device 125 (e.g., a mouse, keyboard, touchscreen, camera for recording video streams and/or capturing images, or microphone for capturing audio). The client computing devices 120, 130 may also include speakers, and all of the components used for connecting these elements to one another.

Although the client computing devices 120, 130 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a netbook, notebook, a smart watch, a head-mounted computing system, or any other device that is capable of obtaining information via a network. As an example the user may input information using a small keyboard, a keypad, microphone, using visual signals with a camera, or a touch screen. In another example, a user may input audio using a microphone and images using a camera, such as a webcam.

As with memory 114, storage system 150 can be any type of computerized storage capable of storing information accessible by the computing devices 108-110, 120, 130 such as one or more of a hard-drive, a solid state hard drive, NAND memory, ROM, RAM, DVD, CD-ROM, write-capable, and read-only memories, or any other device capable of storing data. In addition, storage system 150 may include a distributed storage system where data is stored on a plurality of different storage devices which may be physically located at the same or different geographic locations. As explained herein, storage system 150 may be connected to the computing devices via the network 160 as shown in FIGS. 1 and 2 and/or may be directly connected to any of the computing devices 108-110, 120, 130.

The storage system 150 may store information such as applications, data, and instructions for use with applications or other such information. For instance, the information stored in storage system 150 may include data such as training data, trained classification models, classification models being trained, testing data for testing trained classification models, etc. The storage system 150 may provide the stored information to any of the computing devices 108-110, 120, 130.

Example Interface

A user may generate a machine learning classification model through a node-based user interface. The node-based interface may be a web application provided from a server, such as server computing device 110 to a client computing device, such as client computing device 120. The web application may be loaded in a web browser, such as web browser 129. In some instances, the node-based interface may be a standalone application that executes directly on a client computing device 110, 120. Examples of different aspects of the node-base user interface are provided in FIGS. 3-8.

Figure 3:
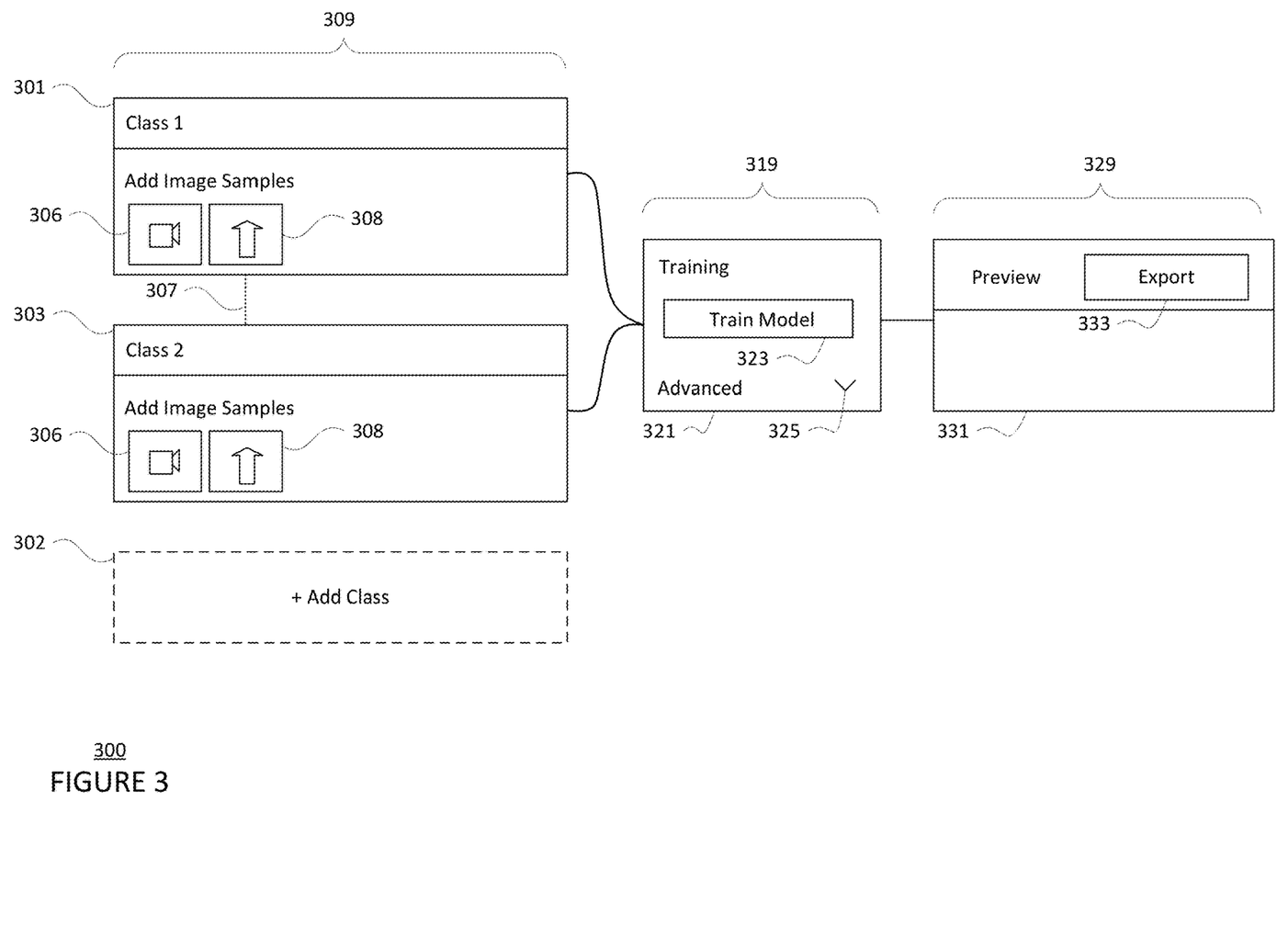
FIG. 3 illustrates an example interface for training a classification model in accordance with aspects of the disclosure.

FIG. 3 provides one example of a possible node-based interface 300 for creating a classification model. The interface 300 may include discrete sections that correspond to the steps of creating a classification model. In this regard, the sections shown in FIG. 3 include a data classification section (shown under bracket 309) to capture and edit training data, a model training section (shown under bracket 319) to train the classification model with the training data, and a model evaluation section (shown under bracket 329) to provide real-time classification of new data using the trained classification model.

Each section 309, 319, 329 of the node-based interface may be made up of nodes that are simultaneously displayed on the interface to provide a singular visual representation of the entire classification model workflow. In this regard, the data classification section 309 may include one or more class nodes for capturing, uploading, and/or editing training data.

For example, FIG. 3 shows the classification section 309 with two class nodes, "Class 1" 301 and "Class 2" 303. Each class node 301, 303 may correspond to a respective class and may include training data within that class for training the classification model. For example, and as shown in the node-based interface 300 in FIG. 4, class node 301 corresponds to class "Stars" and the training data 401 within the class node 301 includes images of stars. Class node 303 corresponds to class "Saturn" and the training data 403 within the class node 303 includes images of Saturn. Although the examples described herein refer to training data including images, other data types, such as text, audio, video, etc., or combinations of different data types may be used as training data.

Figure 5:
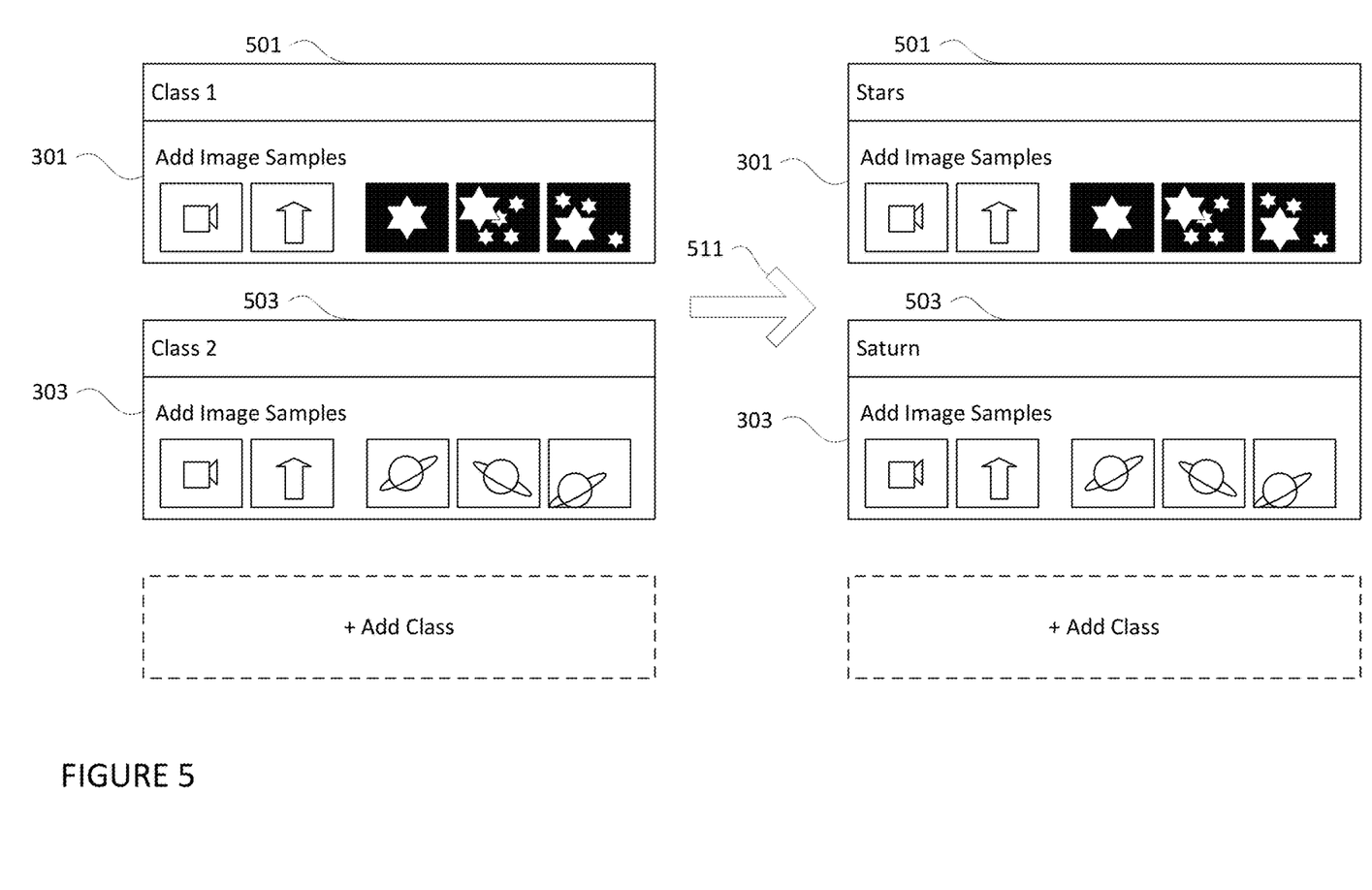
FIG. 5 shows an example of retitling class nodes in accordance with aspects of the disclosure

To distinguish the different class nodes in the data classification section, each class node may be titled. In this regard, each class node may have a default title, such as "Class 1" for class node 301 and "Class 2" for class node 303, as shown in node-based interface 300 of FIG. 3. A user may be able to update each class nodes' title such as by filling in a text box prompt or selecting the title bar of each node and editing the text via typing, speaking, or other such input. For example, and as shown in FIG. 5, class nodes 301 and 303 are shown with their respective default titles—"Class 1" and "Class 2"—on the left side of arrow 511. To retitle the class node 301, a user may select title bar 501 and enter a new title, such as "Stars". Similarly, to retitle the class node 303, a user may select title bar 503 and enter a new title, such as "Saturn", as further shown in FIG. 5. On the right side of the arrow 511, the class nodes 301 and 303 are shown with their respective new titles—"Stars" and "Saturn". The foregoing examples are merely illustrative, and other techniques for altering the title may be provided.

To provide further visual distinction between each class node, the class nodes may be separated. Referring again to FIG. 3, dashed line 307 indicates a default spacing between class nodes 301 and 303. The default spacing shown in FIG. 3 is for illustration purposes only and the default spacing may be longer or shorter than shown by dashed line 307. In some instances the spacing between class nodes may be adjusted, such as by dragging one of the class nodes closer to the other, or adding additional class nodes, as described herein.

Additional class nodes may be added to the data classification section 309. In this regard, the data classification section 309 may include a button to add new class nodes, such as the "+ Add Class" button 302, shown in node-based interface 300 of FIG. 3. Upon a user selecting the "+ Add Class" button 302, a new class node 305, titled "Class 3", may be automatically generated in the data classification section, as shown in the node-based interface 300 in FIG. 6.

Figure 6:
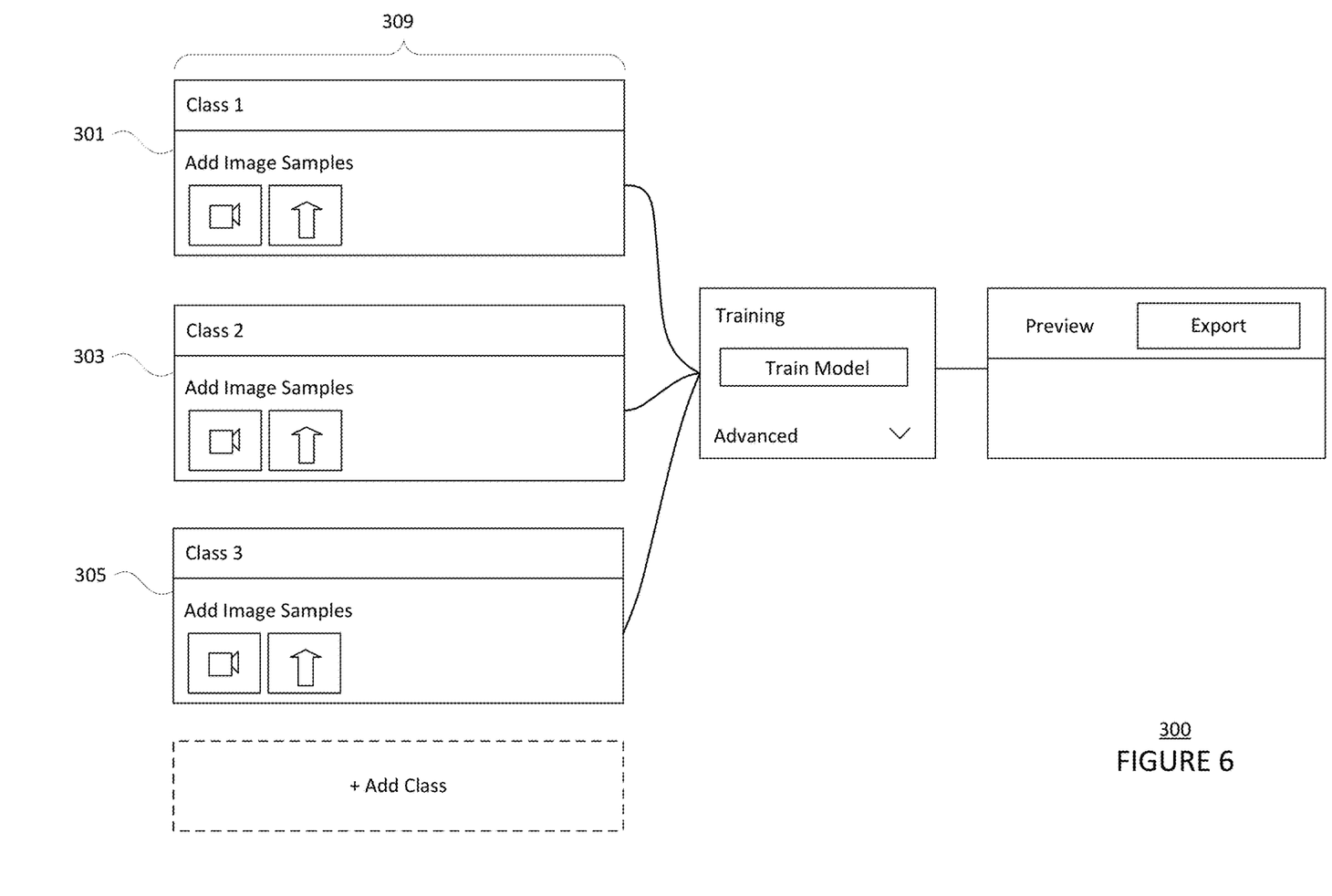
FIG. 6 illustrates additional class nodes in accordance with aspects of the disclosure

Although FIG. 6 shows three class nodes 301, 303, 305, any number of class nodes may be possible. In instances when the number of class nodes exceeds the interface's ability to display them all at once, the ability to scroll through the class nodes, such as with a scroll bar, may be provided.

Class nodes may be deleted from the classification section 309. In this regard, each class node may include a button, menu, or another such interface object (not shown) that provides a user with the ability to delete a class node. In some instances, an interface object for deleting one or more class nodes may be provided on the node-based interface 300, outside of the class nodes 301, 303, 305.

Training data may be captured or uploaded into each class node. In this regard, the interface may provide options for a user to input the training data into each class node. For example, and as shown in FIG. 3, each class node 301, 303 may include a capture data button 306 and an upload button 308. Selection of a capture data button 306 within a class node may cause the class node to display a capture interface.

Figure 7A:
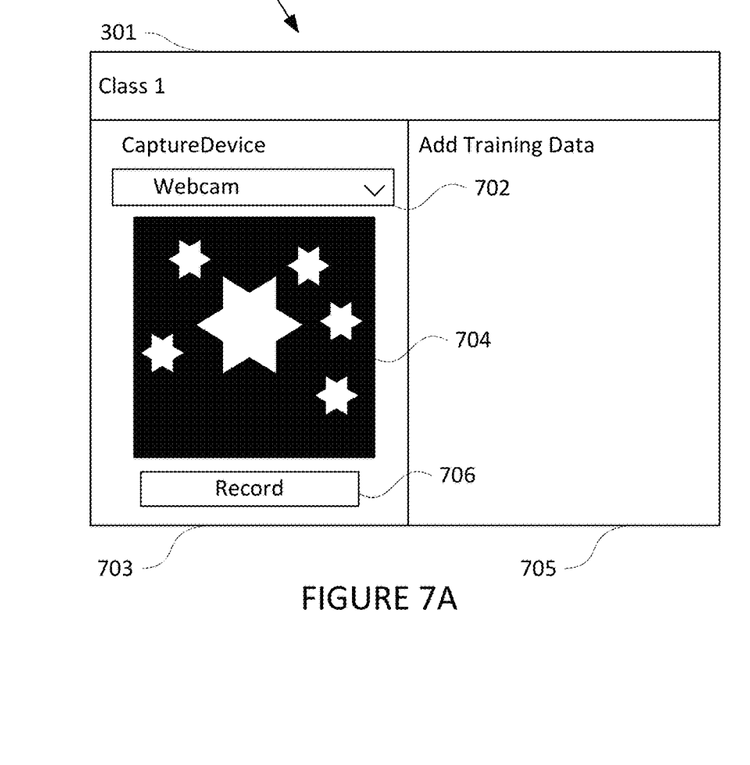
FIG. 7A illustrates an example capture interface in accordance with aspects of the disclosure.
Figure 7B:
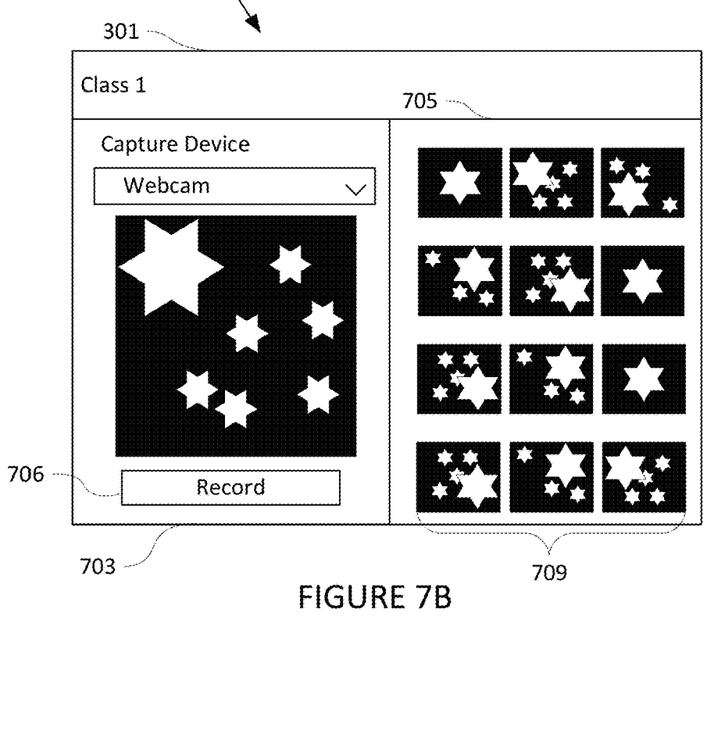
FIG. 7B illustrates an example capture interface with captured data in accordance with aspects of the disclosure.

An example of a capture interface 701 is shown in FIGS. 7A and 7B. The capture interface 701 may include two sections, a capture control section 703 and a training data section 705. The capture control section 703 may include a capture device selection menu 702, a preview window 704, a record button 706, as well as other possible interface objects and windows.

The capture device selection menu may provide a list of available capture devices available to the client device running the web application, such as webcam, microphone, or other such input device 125. Referring to FIG. 7A, a webcam has been selected from the selection menu 702 as the capture device for capturing image training data for class node 301. After selecting a capture device, a preview of the images, audio, video, etc., captured by the selected capture device may be provided in a preview window. For instance, after selecting the webcam from selection menu 702, preview window 704 displays the current output of the selected webcam, which is shown as an image with stars.

A user may select a record button 706 in the capture interface 701 to have the selected capture device record captured images or other such data including audio, video, etc., for use as training data. In this regard, when the user selects a camera as the capture device, the user may hold down the record button 706 to capture sequences of images using the selected camera until the record button is released. In other examples, the record button 706 may be configured to capture a single image, a collection of a preset number of images, images at predetermined time intervals, and/or images over a predetermined length of time. Similar recording options may be provided for recording video via a selected camera and audio via a selected microphone.

As recorded data is captured, thumbnails of the recorded data may be provided in the training data section 705 of the capture interface 701. For example, and as shown in FIG. 7B, training data captured by a webcam for class node 301, includes images of stars shown as thumbnails 709 in the training data section 705, as they are captured. In instances where the data is audio or video, the thumbnails may include audio waves or screenshots, respectively. A user may exit the capture interface 701 by selecting an area outside of the capture interface on the node based interface 300 or selecting an interface object (not shown), such as an exit button.

The selection of the upload button within a class node may cause the class node to display a file selection dialog box within the class node or otherwise overlay a file selection dialog box over the interface. For example, when a user selects upload button 308 in class node 303 a file selection dialog box may appear in the class node. A user may select one or more pieces of data from the file selection dialog box to upload into the class node as training data.

The captured and/or uploaded training data may be automatically inputted into the class node as part of the training data. As further shown in FIG. 4, thumbnails of the training data 401, 403 are shown in each class node 301, 303, respectively. The thumbnails of the training data 401, 403 provide a visualization of what is contained in each class node and to help distinguish the contents of the training data sets between each class node.

Figure 4:
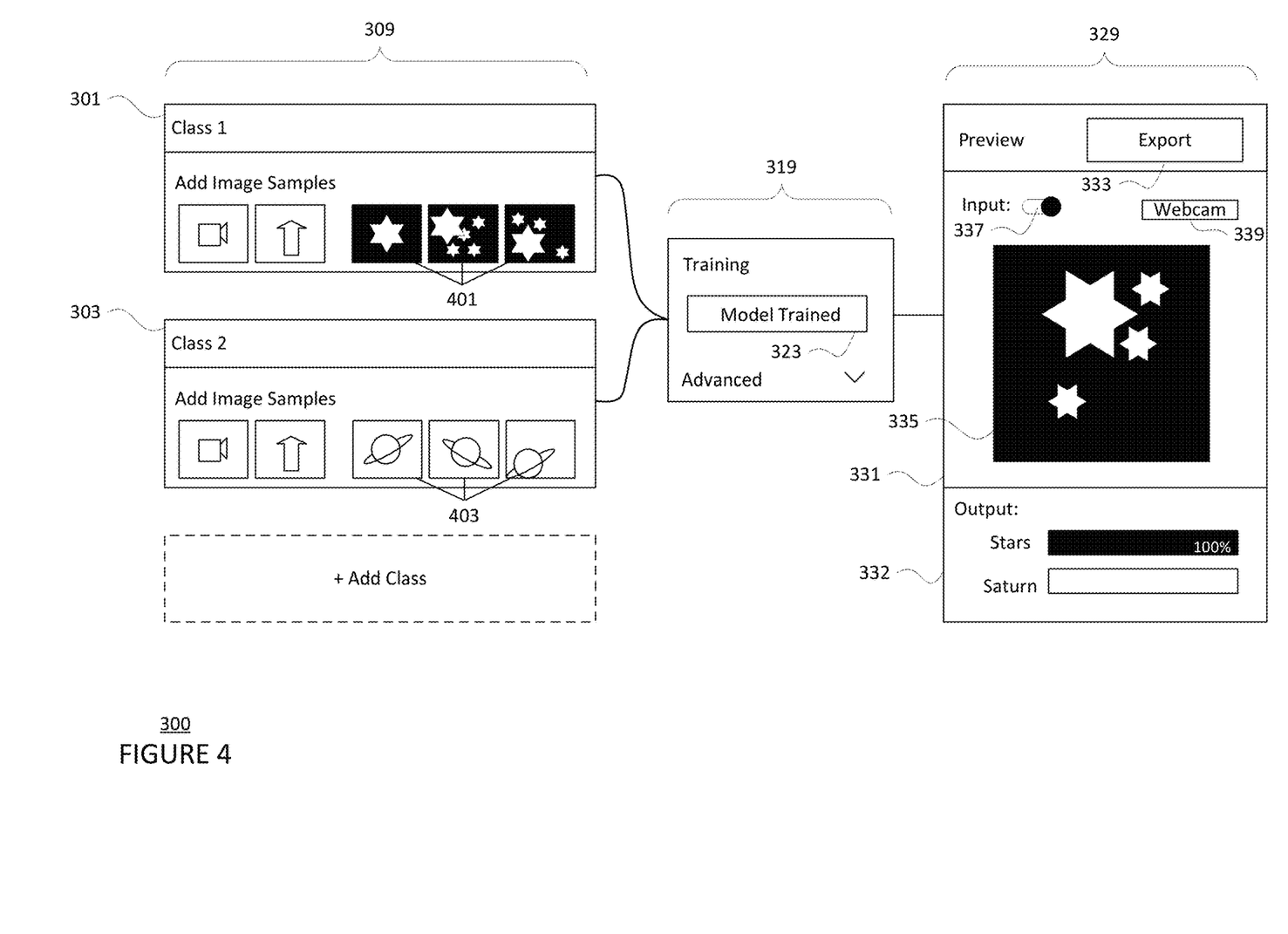
FIG. 4 illustrates an example interface for evaluating a trained classification model in accordance with aspects of the disclosure.
Figure 8:
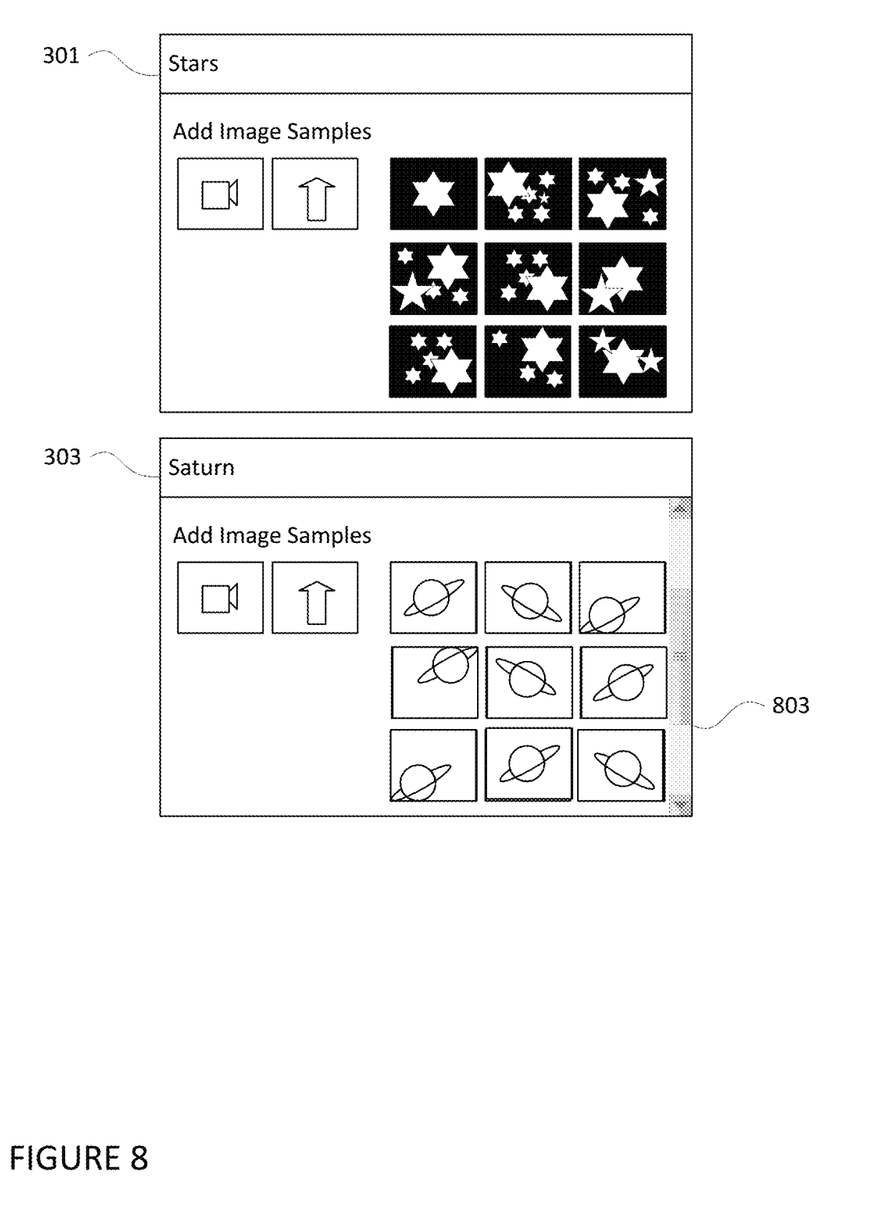
FIG. 8 illustrates an example of expanded class nodes in accordance with aspects of the disclosure.

The class node may be expanded to show additional thumbnails. In this regard, class nodes 301, 303 in FIG. 4 are a default size having a single row of thumbnails corresponding to the training data 401, 403, respectively. The size of the class nodes 301, 303 in FIG. 4 are merely illustrative and other class node sizes may be set as default sizes. In instances where the number of thumbnails in a class node is greater than can be displayed within a default class node size, the class node may be automatically expanded to show additional thumbnails or rows of thumbnails. For instance, class node 301 may expand to fit three rows of thumbnails as shown in FIG. 8. In some instances, when the number of thumbnails or rows of thumbnails exceeds a certain value, the class node may cease to further expand and the ability to scroll through the thumbnails, such as with a scrollbar 803 may be provided, as shown in class 303 of FIG. 8.

The training data within each class node may be edited with editing tools from within each class node. The editing tools may include a cropping tool, rotation tool, flipping tool, cutting tool, contrast tool, brightness tool, equalizers, effects, or other such tools capable of manipulating images, videos, audio, or other such data types. In some instances, editing tools may be used to manipulate the data as it is captured by a capture device. In some instances the node-based interface 300 may include a single set of editing tools for use with all of the class nodes, such as class nodes 301, 303.

Training data may be deleted from each class node. In this regard, a user may select one or more pieces of training data to delete from within a class node. For example, a user may select a piece of training data 401 from class 301 and delete the selected piece. In some instances, all training data may be deleted from a class node or class nodes. For example, a user may select training data 401 and 403 in class nodes 301 and 303 and the selected training data may be deleted simultaneously.

A complete set of training data within a class node or individual pieces of the training data can be exported to an external folder or downloaded for storage and later retrieval. For example, a user may export or download some, or all, of training data 401 from class node 301. Options to delete or export training data from one or more class nodes may be provided within one or more menus or other interface objects, such as buttons, within the class nodes or node-based interface.

The training section 319 of the node-based interface 300 may include a training node 321 for training the classification model, as shown in FIG. 3. As further shown in FIG. 3, the training node 321 includes a start training button 323 labeled, "Train Model", that, when selected, begins the training of the classification model by the training node 321. For example, when the start training button 323 is selected, the training node 321 may begin training a classification model to categorize objects into either class "Stars" or "Saturn" using the training data 401, 403 in class nodes 301, 303. Although training is started by selecting a button in the foregoing example, any object may be used to start training, such as a toggle button, or other such object. In some instances, one or more class nodes may be disabled, such that the training data contained in the disabled class node is not used in training the classification model and/or the classification model is not trained to classify objects into the class associated with the disabled class node.

The training of the classification model by the training node 321 may be done with machine learning algorithms that train the classification model to categorize objects into one of the classes corresponding to the class nodes. The machine learning algorithms may include one or more supervised learning (classification and regression) algorithms such as logistic regression, Bayes classifiers, support vector machine, K-nearest neighbor, or neural networks. The parameters of the machine learning algorithms may be preset to allow the classification model to be trained without additional programming or inputs from the user. As such, even those users who do not know how to program or have any machine learning experience may author a classification model.

The training node 321 may include a parameter interface for altering parameters of the machine learning algorithm used to train the classification model. By default the parameter interface may be hidden from the interface to avoid confusing novice, or otherwise inexperienced users. The parameter interface may be provided upon a user selecting one or more objects such as a menu selection or drop down list.

Figure 9:
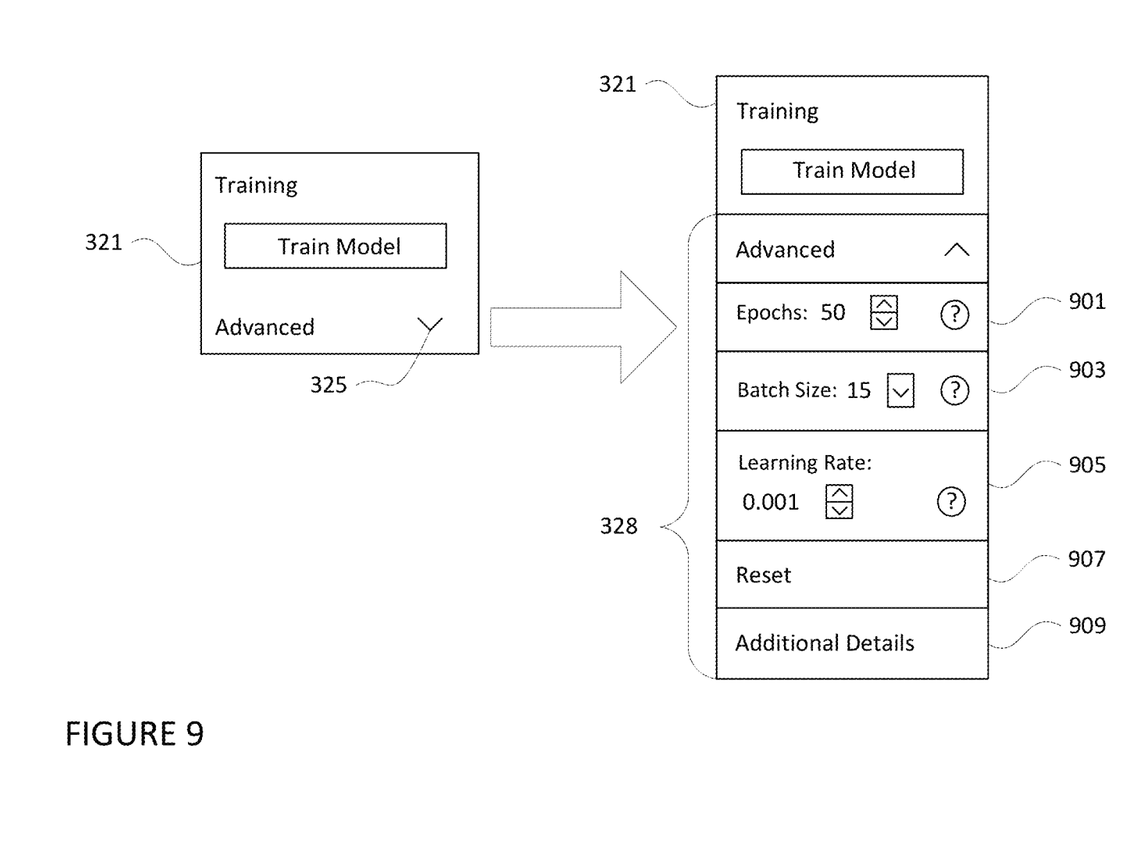
FIG. 9 illustrates an example parameter interface in accordance with aspects of the disclosure.

FIG. 9 shows an example parameter interface 328 that is provided in the training node 321 upon a user selecting the down arrow 325. The parameters that may be altered in the parameter interface include the number of epochs 901, the hatch size 903, and the learning rate 905 used by the machine learning algorithm. Such parameters may be considered "hyperparameters" which alter the training of the classification model before the training process begins. The parameter interface may include an option to provide additional details 909, such as accuracy per epoch and loss per epoch, as well as explanations of each parameter and other machine learning terminology. In some instances, the parameter interface may also include an option to reset the parameters to their defaults 907.

Additional parameters, not shown in the parameter interface 328 of FIG. 9, may also be included. As the node-based interface 300 is algorithm-agnostic, any hyperparameters for a machine learning algorithm being used to train the classification model may be included in the parameter interface 328. For example, when the machine learning algorithm is a convolutional neural network, the parameter interface 328 may include parameters such as number of hidden nodes, type of kernel initializer, loss function, etc.

Upon completion of training the classification model, an indication that the training is complete may be presented in the training node 321. For example, the text of the start training button 323 may change from "Train Model" as shown in FIG. 3 to "Model Trained" as shown in FIG. 4. The start training button 323 may remain functional after training the classification model to enable a user to run the training again, such as when new training data and/or new classes are added to the classification section or parameters of the training node are altered.

The evaluation section 329 of the node-based interface 300 may include an evaluation node 331 for evaluating the performance of the trained classification model. In this regard, the evaluation node 331 may classify evaluation data into one of the respective classes associated with the class nodes. The classification of the data may be shown to the user in an output interface that shows the classification determined by the evaluation node 331 and, in some instances, a confidence in that determination. For instance, and as shown in FIG. 4, the evaluation node 331 evaluated the image of the stars shown in evaluation window 335 using the classification model and classified the image as being in the class stars, as shown in output section 332. The full bar corresponding to the class stars and "100%" text indicates the confidence of the evaluation of the classification of the image of stars as belonging to the class stars is 100%. In instances when the classification model outputs less than 100% confidence in a classification, the text and bar corresponding to each class may indicate the confidence output by the classification model that the data being analyzed corresponds to that class. For instance, a piece of data including an image of a star and an image of Saturn may be classified by the classified model as belonging to both the class stars and Saturn with a confidence of 50% being assigned to both classifications.

The evaluation node may capture evaluation data in real-time or evaluation data may be uploaded via one or more data files. In this regard, the interface may provide options for a user to select a capture device or to upload a data file. For example, and as shown in FIG. 4, the capture device button 339, when selected, may cause the evaluation node to display a list of available capture devices available to the client device, such as a webcam, microphone, or other such input device 125. In the evaluation node 331 shown in FIG. 4, a webcam has been selected as the capture device for capturing evaluation data. After selecting a capture device, the evaluation data being captured by the capture device may be provided in the evaluation window 335. For example, and as shown in FIG. 4, the star image may be captured by the selected capture device. An option to toggle the capture device on and off may be included in the evaluation node, such as with toggle 337.

The evaluation node 331 may export the trained classification model. In this regard, a user may select a button, such as the "Export" button 333 shown in FIG. 4 to download a copy of the trained classification model to their local system or some remote location.

The layout of the sections and nodes may be in any configuration and order. For instance, although the layout of the sections within the interface are shown in a horizontal arrangement with the classification section 309 being on the left side of the interface, the training section 319 being in the middle, and the evaluation section 329 being on the right, as shown in FIG. 4, the sections could be arranged vertically diagonally or in other such arrangement. By providing a horizontal arrangement, a user is provided with an easy to interpret visual representation of the steps of training the classification model.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 10:
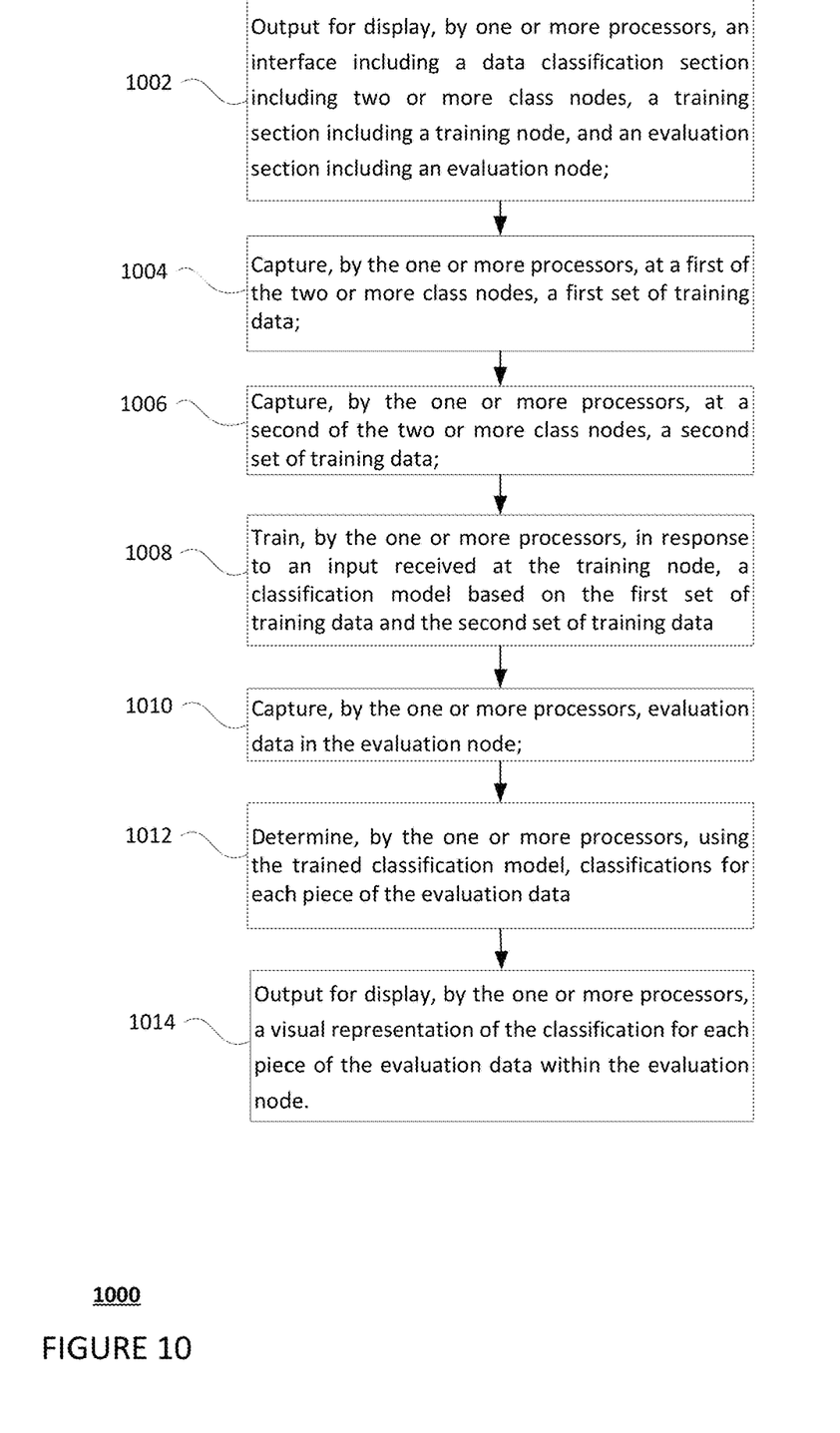
FIG. 10 is a flow diagram representing training of a machine learning classification model in accordance with aspects of the disclosure

Flow diagram 1000 of FIG. 10 is an example of some of the aspects described above which may be performed by one or more of the computing devices, such as client computing devices 120 and 130. In this example, a web browser, such as web browser 129 on client computing device 120 may navigate to a network address. The network address may provide a web application from a server computing device, such as server computing device 110, or storage system, such storage system 150. The web application may be loaded by the web browser 129 on the client computing device. Using the web application, the client computing device may perform the following operations: As shown in block 1002, the one or more processors of the client computing device may output for display an interface including a data classification section including two or more class nodes, a training section including a training node, and an evaluation section including an evaluation node. The one or more processors may capture at a first of the two or more class nodes, a first set of training data and at a second of the two or more class nodes, a second set of training data, as shown in blocks 1004 and 1006, respectively. The one or more processors may train, in response to an input received at the training node, a classification model based on the first set of training data and the second set of training data, as shown in block 1008. The one or more processors may capture evaluation data in the evaluation node and determine, using the trained classification model, classifications for each piece of the evaluation data, as shown in blocks 1010 and 1012, respectively. A visual representation of the classification for each piece of the evaluation data may be output for display within the evaluation node, as shown in block 1014.

In some instances, the training of the classification model may be done remotely, such as by server computing device 110. For example, the client computing device may forward the parameters and training data to the remote server. The remote server may then train a model using the provided parameters and training data. The trained model may be sent from the server to the client device for evaluation as described herein.

The above features provide an easy to interpret visual representation of the steps of training a classification model.

Moreover, by providing each section on the interface at the same time, users may be able to evaluate the performance of the trained classification models while simultaneously viewing the categories of data the model was trained on, so that it is easier to recall exactly which data corresponds with which class, and is more likely to influence the result being output by the evaluation node. Additionally, the interface provides the ability to record new training data and evaluation data nearly instantaneously. In addition, the interface allows users who do not know how to program or users who have no machine learning experience or expertise to create functional machine learning models.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for creating machine learning classification models using a graphical user interface (GUI), comprising:
   outputting for display, by one or more processors, the GUI including a data classification section including two or more class nodes, a training section including a training node, and an evaluation section including an evaluation node;
   capturing, by the one or more processors, by a first of the two or more class nodes using an input device, a first set of training data;
   capturing, by the one or more processors, by a second of the two or more class nodes using the input device, a second set of training data;
   training, by the one or more processors, in response to an input received at the training node, a classification model based on the first set of training data and the second set of training data;
   capturing, by the one or more processors, evaluation data in the evaluation node;
   determining, by the one or more processors, using the trained classification model, classifications for each piece of the evaluation data; and
   outputting for display, by the one or more processors, a visual representation of the classification for each piece of the evaluation data within the evaluation node.

2. The method of claim 1, wherein the data classification section, the training section, and the evaluation section are output for display in a horizontal arrangement, with the training section being positioned between the data classification section and the evaluation section.

3. The method of claim 1, wherein the method further includes receiving an add request at the data classification section for an additional class; and
   adding an additional class node in the data classification section in response to the add request.

4. The method of claim 1, wherein thumbnails of the first set of training data and the second set of training data are displayed in the first class node and second class node, respectively.

5. The method of claim 4, wherein the first class node is automatically expanded to show additional thumbnails of the first set of training data.

6. The method of claim 4, wherein the thumbnails of the first set of training data are scrollable within the first class node.

7. The method of claim 1, wherein the first and second sets of training data are captured with a capture device.

8. The method of claim 1, wherein the evaluation data is captured with a capture device, the method further comprising:
   determining the classifications for each piece of the evaluation data occurs as the evaluation data is captured by the capture device.

9. The method of claim 1, further comprising outputting for display in a preview window in the evaluation node the evaluation data as it is captured, wherein the evaluation node is presented as a window in the interface.

10. The method of claim 1, wherein the classification model is further trained based on parameters, the parameters comprising at least one of a number of epochs, a batch size, and a learning rate to be used during training of the classification model.

11. A system for creating machine learning classification models using a graphical user interface ("GUI"), comprising:
   one or more processors; and
   one or more storage devices in communication with the one or more processors, wherein the one or more storage devices contain instructions configured to cause the one or more processors to:
   output for display the GUI including a data classification section including two or more class nodes, a training section including a training node, and an evaluation section including an evaluation node;
   capture by a first of the two or more class nodes using an input device, a first set of training data;
   capture by a second of the two or more class nodes using the input device, a second set of training data;
   train, in response to an input received at the training node, a classification model based on the first set of training data and the second set of training data;
   capture evaluation data in the evaluation node;
   determine, using the trained classification model, classifications for each piece of the evaluation data; and
   output, a visual representation of the classification for each piece of the evaluation data within the evaluation node.

12. The system of claim 11, wherein the data classification section, the training section, and the evaluation section are output for display in a horizontal arrangement, with the data training section being positioned between the data classification section and the evaluation section.

13. The system of claim 11, wherein the instructions are further configured to cause the one or more processors to:
   receive an add request at the data classification section for an additional class; and
   add an additional class node in the data classification section in response to the add request.

14. The system of claim 11, wherein thumbnails of the first set of training data and the second set of training data are displayed in the first class node and second class node, respectively.

15. The system of claim 14, wherein the first class node is automatically expanded to show additional thumbnails of the first set of training data.

16. The system of claim 14, wherein the thumbnails of the first set of training data are scrollable within the first class node.

17. The system of claim 11, wherein the first and second sets of training data are captured with a capture device.

18. The system of claim 11, wherein the evaluation data is captured with a capture device, the instructions further configured to cause the one or more processors to:
   determine the classifications for each piece of the evaluation data occurs as the evaluation data is captured by the capture device.

19. The system of claim 11, wherein the instructions are further configured to cause the one or more processors to:
   output for display in a preview window in the evaluation node the evaluation data as it is captured, wherein the evaluation node is presented as a window in the interface.

20. The system of claim 11, wherein the classification model is further trained based on parameters, the parameters comprising at least one of a number of epochs, a batch size, and a learning rate to be used during training of the classification model.

* * * * *